US008990603B2

(12) United States Patent
Nagumo

(10) Patent No.: US 8,990,603 B2
(45) Date of Patent: Mar. 24, 2015

(54) IMAGE FORMING APPARATUS AND IMAGE FORMING METHOD FOR REDUCING DETERIORATION OF A SECONDARY BATTERY

(75) Inventor: Takashi Nagumo, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 323 days.

(21) Appl. No.: 13/567,392

(22) Filed: Aug. 6, 2012

(65) Prior Publication Data

US 2013/0047015 A1 Feb. 21, 2013

(30) Foreign Application Priority Data

Aug. 15, 2011 (JP) ................... 2011-177773

(51) Int. Cl.
*G06F 1/32* (2006.01)
*G03G 15/00* (2006.01)
*H04N 1/00* (2006.01)
*B41J 29/38* (2006.01)
(Continued)

(52) U.S. Cl.
CPC .............. *G06F 1/32* (2013.01); *G03G 15/5004* (2013.01); *H04N 1/00068* (2013.01); *H04N 1/00896* (2013.01); *H04N 1/00901* (2013.01); *H04N 2201/0094* (2013.01); *Y02B 60/1267* (2013.01); *B41J 29/38* (2013.01); *H02J 9/062* (2013.01); *H02J 7/007* (2013.01)
USPC ................. 713/324; 713/320; 399/88; 399/89

(58) Field of Classification Search
CPC .......... G06F 1/26; G06F 1/32; G03G 15/5004
USPC ................. 713/300, 320; 399/88, 89
See application file for complete search history.

(56) References Cited

U.S. PATENT DOCUMENTS 7,224,920 B2 * 5/2007 Koyama ........................ 399/89
2007/0122174 A1 * 5/2007 Yamamoto ...................... 399/88
(Continued)

FOREIGN PATENT DOCUMENTS

JP 2009-222824 10/2009

OTHER PUBLICATIONS

Masahiro Ichimura, et al. (2005) *Longevity Characteristics of Small Lithium-ion Battery, 3.2 Relationship between a discharge state in the partial discharge and cycle deterioration*, [available at : http://www.ntt-fsoken.co.jp/research/pdf/2005_ichi.pdf] [viewed on Jul. 25, 2011].

*Primary Examiner* — Chun Cao
(74) *Attorney, Agent, or Firm* — Oblon, McClelland, Maier & Neustadt, L.L.P.

(57) ABSTRACT

An image forming apparatus includes a receiving unit configured to receive an input regarding a print process from a user; a setting unit configured to set the apparatus to normal or energy saving mode based on the input from the user, the normal mode causing the apparatus to be operated by the power supplied from a power supply unit, the energy saving mode causing the apparatus to be operated by the power supplied from the power supply unit or a secondary battery so that power consumption of the apparatus is less than that in the normal mode; a calculation unit configured to calculate a charging amount of the battery based on an energy saving time for which the apparatus has been in the energy saving mode; and a charging unit configured to charge the battery with the power from the power supply unit by the charging amount.

8 Claims, 6 Drawing Sheets

(51) Int. Cl.
*H02J 9/06* (2006.01)
*H02J 7/00* (2006.01)

(56) References Cited

U.S. PATENT DOCUMENTS

| | | | |
|---|---|---|---|
| 2009/0278980 A1* | 11/2009 | Sato | 348/372 |
| 2011/0219251 A1* | 9/2011 | Onishi | 713/323 |
| 2012/0131367 A1* | 5/2012 | Kamijima | 713/323 |
| 2012/0288288 A1* | 11/2012 | Imaizumi | 399/38 |
| 2012/0331313 A1* | 12/2012 | Yoshioka | 713/300 |
| 2012/0331322 A1* | 12/2012 | Suzuki | 713/323 |
| 2013/0026837 A1* | 1/2013 | Nozawa | 307/66 |
| 2013/0036320 A1* | 2/2013 | Yoshimura | 713/323 |

* cited by examiner

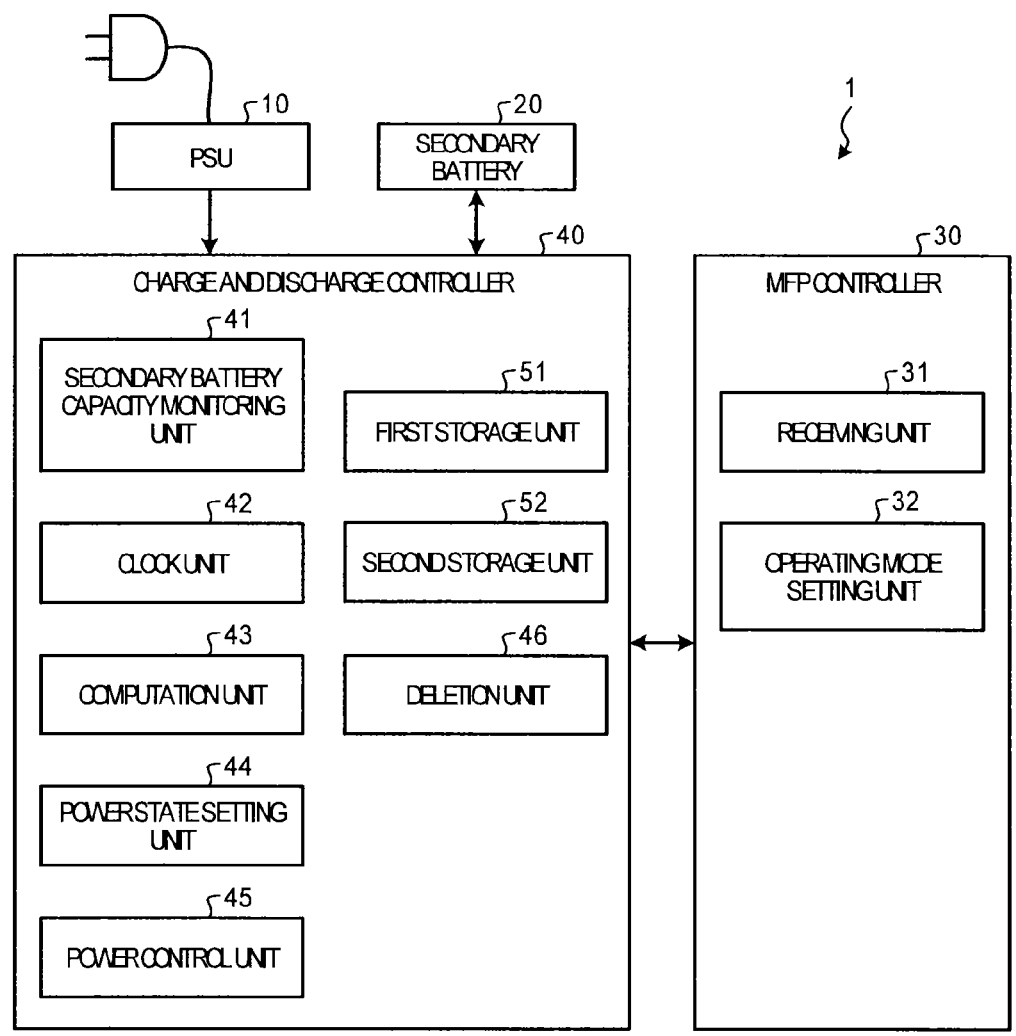

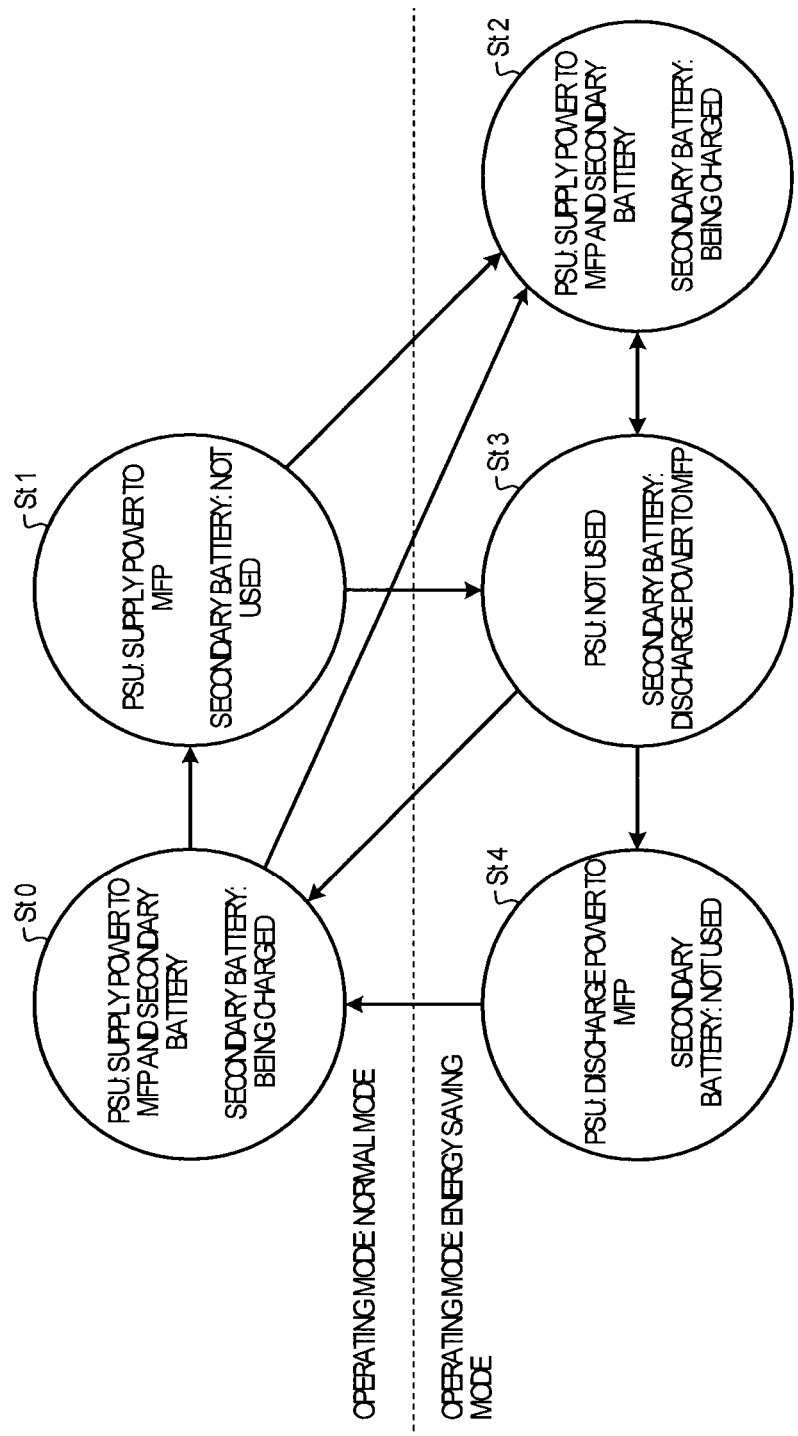

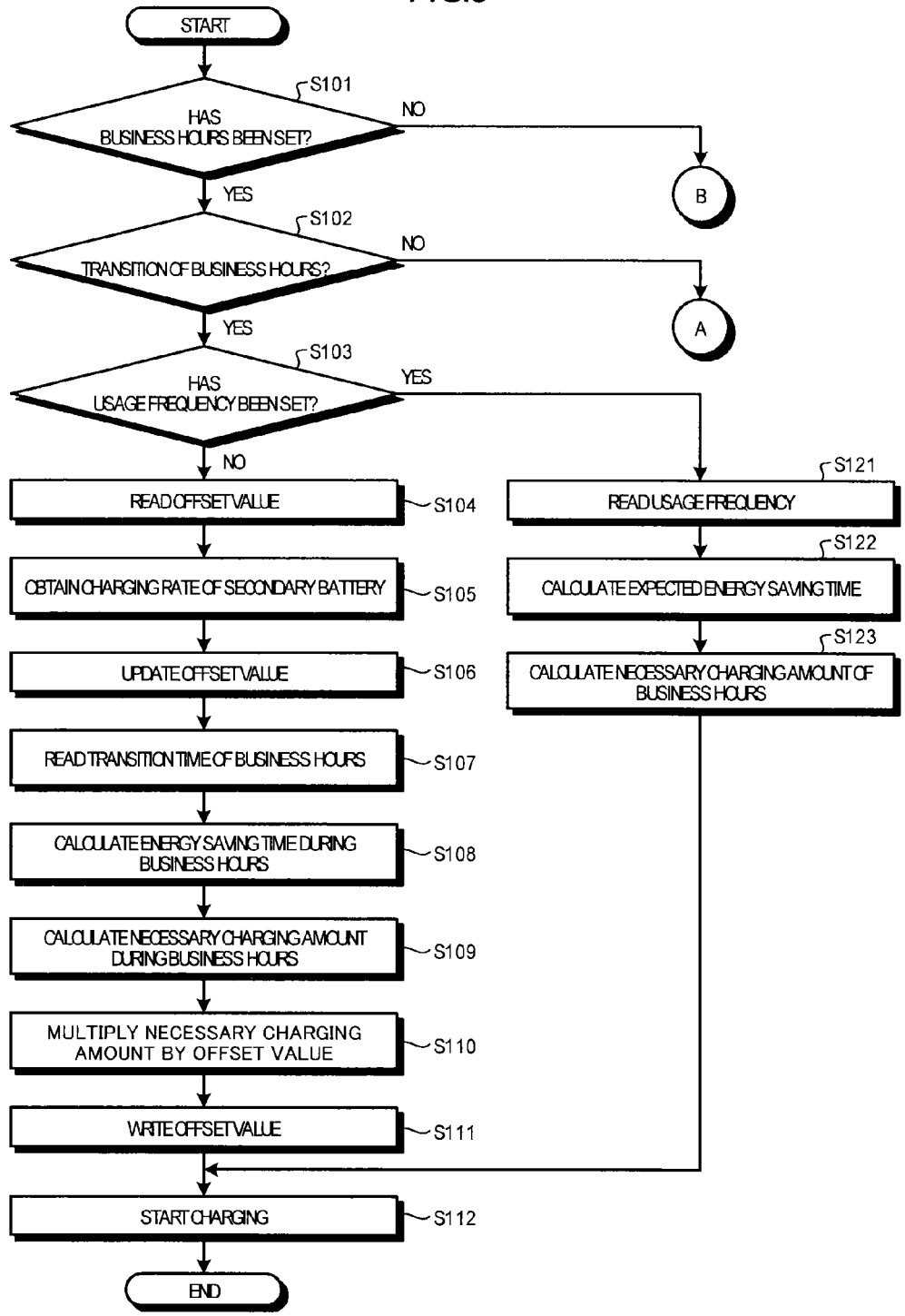

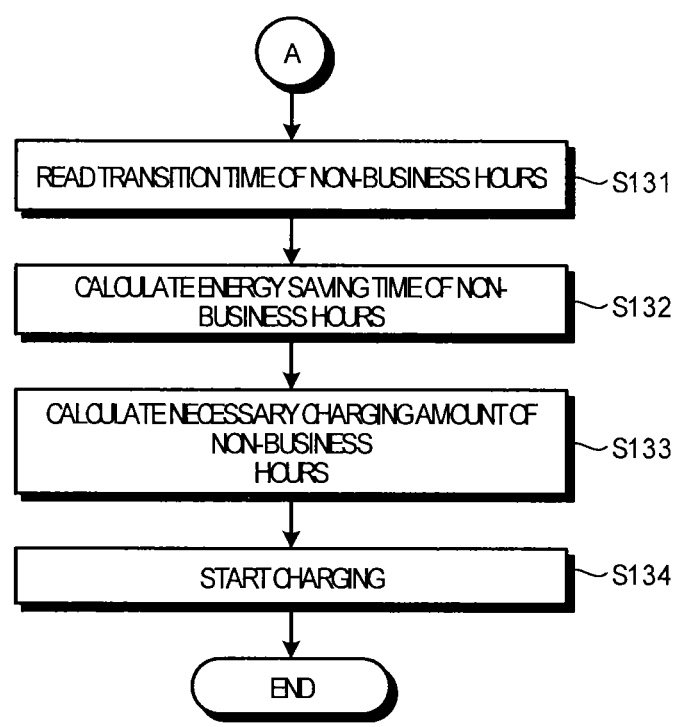

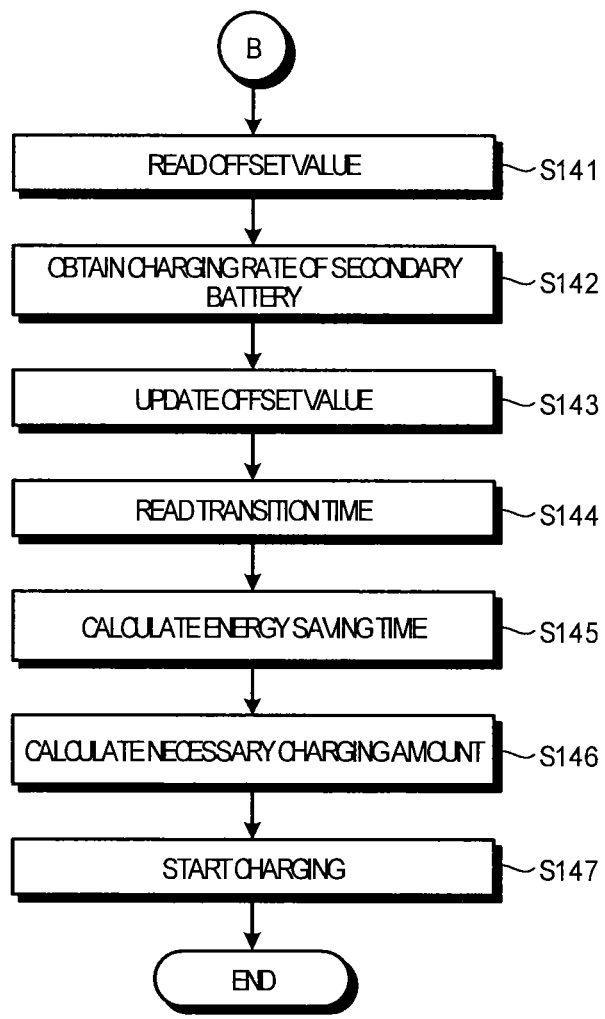

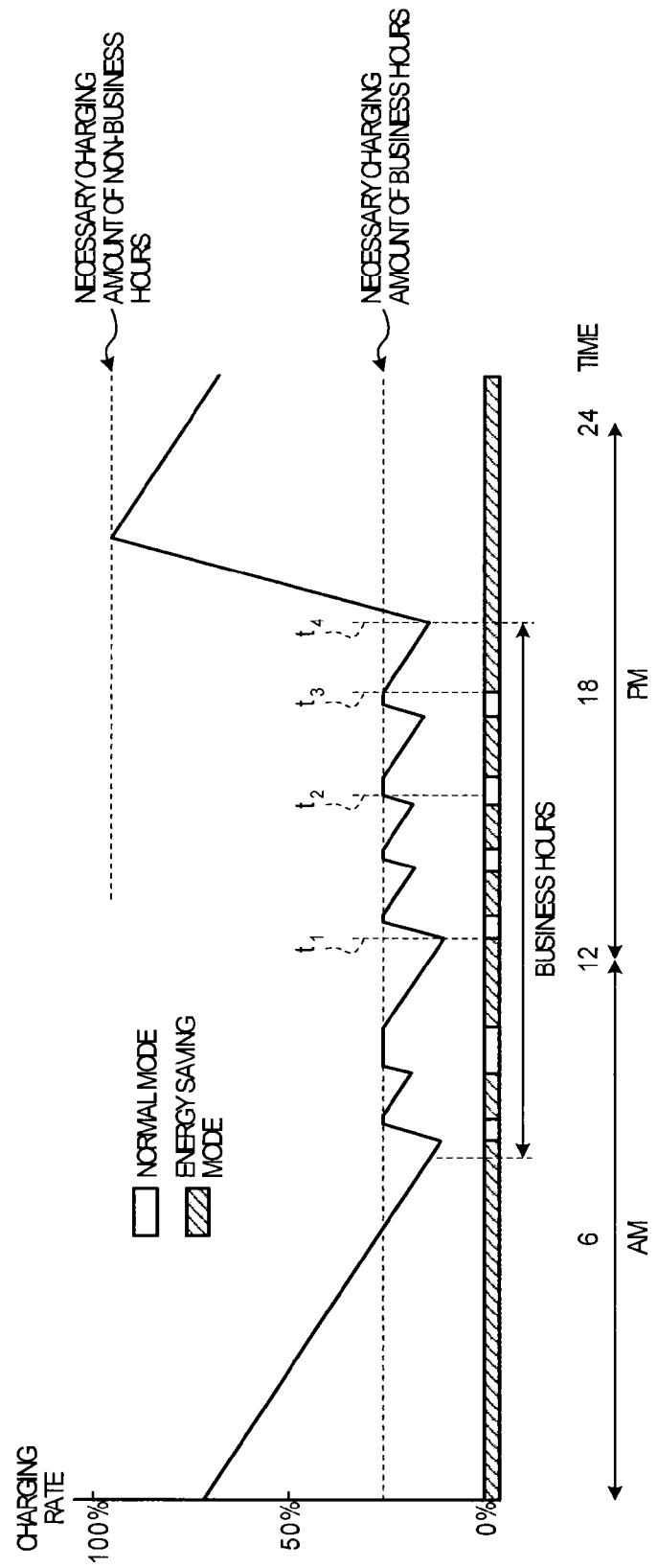

IMAGE FORMING APPARATUS AND IMAGE FORMING METHOD FOR REDUCING DETERIORATION OF A SECONDARY BATTERY

CROSS-REFERENCE TO RELATED APPLICATION

The present application claims priority to and incorporates by reference the entire contents of Japanese Patent Application No. 2011-177773 filed in Japan on Aug. 15, 2011.

BACKGROUND OF THE INVENTION

1. Field of the Invention

The present invention relates to an image forming apparatus and an image forming method.

2. Description of the Related Art

An office device such as an MFP (multi function printer) has been conventionally known to have an energy-saving standby mode in addition to a normal mode for normal operation. The energy-saving standby mode and the normal mode serve as operation modes of the device. In the energy-saving standby mode, the supply of power to any portions of the device is stopped during a time period such as nighttime in which the device is not used for long hours so that the power consumption of the device is reduced. For example, Japanese Patent Application Laid-open No. 2009-222824 discloses an image forming apparatus including a secondary battery in addition to an AC power source. This image forming apparatus has two operation modes that are a normal mode and an energy-saving standby mode. In the normal mode, electric power is supplied from the AC power source to each component of the image forming apparatus. In the energy-saving standby mode, on the other hand, the electric power is supplied from the secondary battery to each component of the image forming apparatus.

A lithium-ion secondary battery, which can be charged and discharged, has been widespread as a secondary battery used in electrical machinery and apparatus. The lithium-ion secondary battery has advantages such as a little memory effect phenomenon, a long cycle life, and a high electromotive force of 3.6 V for one battery. On the other hand, the lithium-ion secondary battery has disadvantages such as battery capacity deterioration caused by being used or stored in an almost fully charged state, and discharge capacity reduction due to repeated charge and discharge (ICHIMURA, Masahiro, *Longevity Characteristics of Small Lithium-ion Battery*, 3.2 *Relationship between a discharge state in the partial discharge and cycle deterioration*, NTT BTI 2005 [online], [retrieved on 2011-07-25]. Retrieved from the Internet: <URL:http://www.ntt-fsoken.co.jp/research/pdf.2005_ichi.pdf>.

If an MFP using a lithium-ion battery as a secondary battery does not use the power supplied from an AC power source and uses the power supplied only from the secondary battery in an energy-saving standby mode, the secondary battery needs to be charged during a normal mode so that the power charged in the second battery is not exhausted in the energy-saving standby mode. However, during business hours in which the MFP is often in operation, for example, switching between the normal mode and the energy-saving standby mode is frequently repeated. Such a repeating cycle constantly keeps the secondary battery in a highly charged state, causing a problem of accelerating secondary battery deterioration.

Therefore, there is a need for an image forming apparatus and an image forming method capable of reducing deterioration of a second battery and increasing longevity of the secondary battery.

SUMMARY OF THE INVENTION

It is an object of the present invention to at least partially solve the problems in the conventional technology.

According to an embodiment, there is provided an image forming apparatus that includes a power supply unit configured to supply power; a secondary battery configured to be charged with the power from the power supply unit and to supply the charged power; a receiving unit configured to receive an input regarding a print process from a user; a mode setting unit configured to set the image forming apparatus to be in a normal mode or an energy saving mode based on the input from the user, the normal mode causing the image forming apparatus to be operated by the power supplied from the power supply unit, the energy saving mode causing the image forming apparatus to be operated by the power supplied from the power supply unit or the secondary battery so that power consumption of the image forming apparatus is less than that in the normal mode; a charging amount calculation unit configured to calculate a charging amount of the secondary battery based on an energy saving time that is a time for which the image forming apparatus has been in the energy saving mode; and a charging unit configured to charge the secondary battery by the charging amount calculated by the charging amount calculation unit.

According to another embodiment, there is provided an image forming method performed by an image forming apparatus. The method includes receiving, by a receiving unit of the image forming apparatus, an input regarding a print process from a user; setting, by a mode setting unit of the image forming apparatus, the image forming apparatus to be in a normal mode or an energy saving mode based on the input from the user, the normal mode causing the image forming apparatus to be operated by the power supplied from a power supply unit of the image forming apparatus, the energy saving mode causing the image forming apparatus to be operated by the power supplied from the power supply unit or a secondary battery of the image forming apparatus so that power consumption of the image forming apparatus is less than that in the normal mode, the secondary battery being configured to be charged with the power from the power supply unit; calculating, by a charging amount calculation unit of the image forming apparatus, a charging amount of the secondary battery based on an energy saving time that is a time for which the image forming apparatus has been in the energy saving mode; and charging, by a charging unit of the image forming apparatus, the secondary battery by the calculated charging amount.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a configuration of an MFP;

FIG. 2 is a diagram illustrating an operating mode of the MFP 1 and power state transition of a PSU and a secondary battery 20;

FIG. 3 is a flowchart illustrating a procedure for calculating a necessary charging amount;

FIG. 4 is a flowchart illustrating a procedure for calculating a necessary charging amount;

FIG. 5 is a flowchart illustrating a procedure for calculating a necessary charging amount; and FIG. 6 is a schematic diagram illustrating a change in an amount of power in the secondary battery during a day.

DETAILED DESCRIPTION OF THE PREFERRED EMBODIMENTS

Exemplary embodiments of the present invention will be described in detail below with reference to drawings.

First Embodiment

FIG. 1 is a block diagram illustrating a configuration of a multi function printer (MFP) 1 serving as an image forming apparatus according to a first embodiment of the present invention. The MFP 1 includes a power supply unit (PSU) 10 serving as a main power source of the MFP 1, a secondary battery 20, an MFP controller 30 for controlling the entire MFP 1, and a charge and discharge controller 40 for controlling the PSU 10 and the secondary battery 20.

The PSU 10 converts a voltage from an AC power source (commercial power source) into a voltage that can be used by each component of the MFP 1. The PSU 10 supplies the power from the commercial power source to each component of the MFP 1. The secondary battery 20 is a lithium-ion secondary battery. The secondary battery 20 is charged by the PSU 10, and supplies the charged power to each component of the MFP 1.

The MFP controller 30 includes a receiving unit 31 and an operating mode setting unit 32. The receiving unit 31 receives various inputs from a user. For example, information to be input from a user includes business hours, business days, and usage frequency of the MFP 1, in addition to a print instruction for a print process in the MFP 1. The business hours are information indicating a time period in which business works using the MFP 1 are conducted during a single day. A user inputs an opening time and a closing time of the actual business hours, for example, from 8 o'clock to 18 o'clock. The business days is information indicating days in which business works is conducted. The usage frequency is information indicating how often the MFP 1 is used during the business hours.

The operating mode setting unit 32 sets the operating mode of the MFP 1 based on the presence or absence of an input from a user. The operating mode includes a normal mode and an energy saving mode. In the normal mode, the MFP 1 can form an image. The normal mode includes a state in which the MFP 1 is performing an image forming operation, and a state in which the MFP 1 awaits printing. In the normal mode, the PSU 10 supplies the power to the MFP 1.

The energy saving mode is a state in which power consumption is less than the normal mode. In the energy saving mode, the supply of power to any portions of the MFP 1 is stopped. When the MFP 1 is not used for long hours such as during nighttime, the MFP 1 is set to the energy saving mode to reduce power consumption thereof. In the energy saving mode, the secondary battery 20 or the PSU 10 supplies the power to the MFP 1. In the energy saving mode, the MFP 1 cannot perform an image forming operation. In the energy saving mode, when the receiving unit 31 receives a print instruction from a user, the operating mode setting unit 32 sets the operating mode to the normal mode. Specifically, the operating mode setting unit 32 shifts the operating mode from the energy saving mode to the normal mode. After the shift of the operating mode to the normal mode, a print process in the MFP 1 is executed.

The operating mode setting unit 32 sets the operating mode of the MFP 1 to the normal mode when the MFP 1 is powered on. Moreover, if the receiving unit 31 continues not to receive any input including a print instruction from a user for a prescribed time after the normal mode is set, the operating mode setting unit 32 shifts the operating mode from the normal mode to the energy saving mode, the prescribed time being set beforehand. Accordingly, the operating mode setting unit 32 manages the shift of the operating mode of the MFP 1.

The charge and discharge controller 40 includes a secondary battery capacity monitoring unit 41, a clock unit 42, a computation unit 43, a power state setting unit 44, a power control unit 45, a deletion unit 46, a first storage unit 51, and a second storage unit 52.

The secondary battery capacity monitoring unit 41 observes a voltage of the secondary battery 20. The secondary battery capacity monitoring unit 41 calculates a charging rate based on voltage and charge capacity properties of the secondary battery 20. The charging rate indicates a proportion of an amount of power currently charged to an amount of power when the secondary battery 20 is fully charged. The clock unit 42 is a clock installed inside the MFP 1. Whenever the operating mode of the MFP 1 is shifted by the operating mode setting unit 32 from the normal mode to the energy saving mode or from the energy saving mode to the normal mode, the computation unit 43 correlates transition information with a transition time and stores such information into the first storage unit 51. The transition information indicates the transition (shift) into either of the modes.

The first storage unit 51 stores the transition information and the transition time in a deletable manner. Assume that the number of the transition times to be stored in the first storage unit 51 is up to a prescribed number that is set beforehand. In another example case, the transition time to be stored in the first storage unit 51 may be a transition time provided within a certain period in the past only.

The second storage unit 52 stores various information to be used by the charge and discharge controller 40. For example, the second storage unit 52 stores setting information such as business hours, business days, usage frequency of MFP 1 which are received by the receiving unit 31 of the MFP controller 30. The information such as the business hours, the business days, and the usage frequency is stored in the second storage unit 52 when a user inputs such information. However, the setting information is not stored in the second storage unit 52 if the user does not input such information. Moreover, the second storage unit 52 stores an offset value to be used by the computation unit 43. The offset value will be described later.

The computation unit 43 calculates an energy saving time based on the charging rate calculated by the secondary battery capacity monitoring unit 41 and the transition time stored in the first storage unit 51. The energy saving time is a period for which the energy saving mode has continued. When the business hours have been stored in the second storage unit 52, the computation unit 43 calculates the energy saving time during business hours, or the energy saving time during non-business hours.

Moreover, when the receiving unit 31 receives designation of the usage frequency of the MFP 1, and the usage frequency has been stored in the second storage unit 52, the computation unit 43 calculates an expected energy saving time based on the usage frequency stored in the second storage unit 52.

Moreover, the computation unit 43 calculates a necessary charging amount of the secondary battery 20 based on the calculated energy saving time or the calculated expected energy saving time and the charging rate calculated by the secondary battery capacity monitoring unit 41. Herein, the necessary charging amount represents an expected amount of power (charging amount) needed for the secondary battery 20 before the operating mode returns to the normal mode next time if electric power is only supplied from the secondary battery 20 to the MFP 1 in the energy saving mode. When the business hours have been stored in the second storage unit 52, the computation unit 43 calculates the necessary charging amount for the business hours based on the energy saving time during the business hours. The computation unit 43 calculates the necessary charging amount for the non-business hours based on the energy saving time during the non-business hours. A method for calculating the necessary charging amount will be described later. The computation unit 43 according to the present embodiment functions as a charging amount calculation unit, an energy saving time calculation unit, and an expected energy saving time calculation unit.

The power state setting unit 44 sets power states of the PSU 10 and the secondary battery 20 based on the transition time stored in the first storage unit 51, the setting information stored in the second storage unit 52, the charging rate of the secondary battery 20, and the operating mode of the MFP 1, for example. Then, the power state setting unit 44 notifies the power control unit 45 of the set power states of the PSU 10 and the secondary battery 20. The power state represents the presence or absence of supply of power, for example. The power state will be described later.

The power control unit 45 switches the supply of power of the PSU 10 and the secondary battery 20 based on the power state set by the power state setting unit 44. Moreover, the secondary battery capacity monitoring unit 41 switches the secondary battery 20 to charging, discharging, and standby. The secondary battery capacity monitoring unit 41 transforms a voltage of the secondary battery 20 into a voltage available for the MFP 1 when the secondary battery 20 is discharged. When the secondary battery 20 is charged, the power control unit 45 according to the present embodiment allows the secondary battery 20 to be charged only in a necessary charging amount calculated by the computation unit 43 to increase longevity of the secondary battery 20. In other words, the secondary battery 20 is not fully charged. The power control unit 45 according to the present embodiment functions as a charging unit.

The deletion unit 46 deletes any portions or all of the transition times stored in the first storage unit 51 according to a deletion instruction received by the receiving unit 31.

FIG. 2 is a diagram illustrating the operating mode of the MFP 1 and power state transition of the PSU 10 and the secondary battery 20. When the operating mode of the MFP 1 is set to the normal mode, two power states of St0 and St1 are provided. When the operating mode of the MFP 1 is set to the energy saving mode, three power states of St2, St3, and St4 are provided. The power state setting unit 44 manages the transition from one to another within these five power states.

The state St0 is set when the MFP 1 is powered on, when the setting of the MFP 1 is changed, and when the operating mode is transitioned from the energy saving mode to the normal mode. In the state St0, the power control unit 45 allows the supply of power from the PSU 10 to the MFP 1 and the secondary battery 20. In the state St0, that is, the secondary battery 20 is charged by the PSU 10. In the state St0, only the PSU 10 supplies the power to the MFP 1. When the power state is transitioned to the state St0, the computation unit 43 of the charge and discharge controller 40 calculates a necessary charging amount of the secondary battery 20 for business hours. When an amount of power of the secondary battery 20 reaches the necessary charging amount calculated by the computation unit 43 for the business hours, the power state setting unit 44 sets the power state to St1. In other words, the power state setting unit 44 allows transition of the power state from St0 to St1.

On the other hand, when a time is changed to non-business hours, or when the operating mode is shifted from the normal mode to the energy saving mode before the calculated necessary charging amount is reached, the power state setting unit 44 allows transition of the power state from St0 to St2.

In the state St1, the secondary battery 20 is charged and has an electric power of the necessary charging amount. Thus, the secondary battery 20 does not need to be charged. Accordingly, in the state St1, the power control unit 45 allows the supply of power from the PSU 10 to the MFP 1 only. When the operating mode is shifted from the normal mode to the energy saving mode in the state St1, the power state setting unit 44 allows transition of the power state from St1 to St3. Moreover, when the time is changed from business hours to non-business hours in the state St1, the power state setting unit 44 allows transition of the power state from St1 to St2.

The state St2 is provided when the operating mode is shifted from the normal mode to the energy saving mode, or the time is changed to the non-business hours before charging of the secondary battery 20 from the PSU 10 is completed. In the St2 state, the power control unit 45 allows the supply of power from the PSU 10 to the MFP 1 and the secondary battery 20. Herein, an amount of power supplied from the PSU 10 to the MFP 1 is less than that in the normal mode. When an amount of power of the secondary battery 20 reaches the necessary charging amount calculated in the state St0, the power state setting unit 44 allows transition of the power state from St2 to St3. When the time is changed from business hours to non-business hours, and the power state is transitioned from St1 to St2, the computation unit 43 calculates a necessary charging amount for the non-business hours.

In the state St3, the secondary battery 20 is charged and has an electric power of the necessary charging amount. In the state St3, therefore, the power control unit 45 allows the supply of power from the secondary battery 20 to the MFP 1, not from the PSU 10 to the MFP 1. When the operating mode is shifted from the energy saving mode to the normal mode, the power state setting unit 44 allows transition of the power state from St3 to St0. On the other hand, if the battery capacity of the secondary battery 20 is emptied during the energy saving mode due to a prediction error, the power state setting unit 44 allows transition of the power state from St3 to St4. In the state St3, when the time is changed from business hours to non-business hours, the power state setting unit 44 allows transition of the power state from St3 to St2.

In the state St4, the power control unit 45 allows the supply of power from the PSU 10 to the MFP 1. In the state St4, the power is not supplied from the secondary battery 20 to the MFP 1, and the secondary battery 20 is not charged from the PSU 10. Accordingly, if the battery capacity of the secondary battery 20 is emptied during the energy saving mode, the power control unit 45 allows the supply of power from the PSU 10 to the MFP 1 only. When the operating mode is shifted from the energy saving mode to the normal mode, the power state setting unit 44 allows transition of the power state from St4 to St0.

FIGS. 3 to 5 are flowcharts illustrating a procedure for calculating a necessary charging amount. The charge and discharge controller 40 executes this calculation procedure when the operating mode is set to the normal mode and the power state is transitioned to St0. The necessary charging amount calculation procedure is also executed when the time is changed from business hours to non-business hours while the operating mode is being in the energy saving mode, and then the power state is transitioned from St3 to St2.

The computation unit 43 first determines whether the business hours has been stored in the second storage unit 52, that is, the computation unit 43 determines whether business hours has been set by a user (step S101). When the business hours has been set (Yes in step S101), the computation unit 43 determines whether the time at which the operating mode is set to the normal mode is during the business hours (step S102). When the time is during the business hours (Yes in step S102), the computation unit 43 determines whether the usage frequency has been stored in the second storage unit 52, that is, the computation unit 43 determines whether the usage frequency has been set by the user (step S103).

When the usage frequency has not been set (No in step S103), the computation unit 43 reads an offset value stored in the second storage unit 52 (step S104). The offset value is determined according to an amount of electric power supplied from the secondary battery 20 during the past energy saving mode, and is a value to be multiplied by the necessary charging amount calculated by the computation unit 43. Although a default value of the offset value stored in the second storage unit 52 is 0%, the default value is updated as necessary in step S106 which will be described later.

Subsequently, the computation unit 43 obtains a charging rate of the secondary battery 20 when the operating mode is set to the normal mode, the charging rate being calculated by the secondary battery capacity monitoring unit 41. In other words, the computation unit 43 obtains a charging rate at the time of return to the normal mode (step S105). Then, the computation unit 43 updates the offset value based on the charging rate (step S106). The charging rate of the secondary battery 20 is determined according to an amount of electric power remained in the secondary battery 20 after the electric power is supplied from the secondary battery 20 during the energy saving mode prior to return to the normal mode. The computation unit 43 updates the offset value based on this charging rate.

Particularly, when a charging rate at the time of return is smaller than or equal to a first threshold that is set beforehand, the computation unit 43 increases the read offset value by a first prescribed amount that is set beforehand. When a charging amount at the time of return is greater than or equal to a second threshold that is set beforehand, the computation unit 43 decreases the read offset value by a second prescribed amount that is set beforehand. For example, when a charging amount at the time of return is 0%, assume that an updated offset value is provided by adding an offset value being read to 5% of this read offset value. When the charging rate at the time of return is greater than or equal to 50%, assume that an updated offset value is provided by subtracting 5% of an offset value being read from this read offset value.

A charging rate of 0% at the time of return indicates that an amount of electric power charged to the secondary battery 20 in shift to the energy saving mode is excessively small. Therefore, when the charging rate is 0%, the offset value is updated so as to be increased. On the other hand, a charging rate having a large amount indicates that an amount of electric power charged to the secondary battery 20 in shift to the energy saving mode is excessively large. Accordingly, when the charging rate is a large value, the offset value is updated so as to be decreased.

The offset value can be a value that allows a charging amount at the time of return to the normal mode to be reflected in a necessary charging amount to be calculated next time. A method for calculating the updated offset value is not limited to the method described in the present embodiment.

Subsequently, the computation unit 43 reads a transition time of the business hours from the first storage unit 51 (step S107). Then, the computation unit 43 calculates an energy saving time during the business hours based on the business hour transition time read from the first storage unit 51 (step S108). Particularly, among the transition times read from the first storage unit 51, the computation unit 43 specifies a time from a transition time correlated with transition information for transition from the normal mode to an energy saving mode to a transition time correlated with transition information for transition from the energy saving mode to the normal mode. In other words, the computation unit 43 obtains a time for which the energy saving mode has continued as the energy saving mode. Then, the computation unit 43 determines a total energy saving time by addition of all the energy saving times obtained based on all the transition times stored in the first storage unit 51. Subsequently, the computation unit 43 calculates an average value of the energy saving times by dividing the total energy saving time by the number of times of transition to the energy saving mode during the business hours. The computation unit 43 treats this average value as the energy saving time.

Next, the computation unit 43 calculates a necessary charging amount during the business hours based on the energy saving time calculated in step S107 (step S109). In the MFP 1, an amount of power consumption is constant during the energy saving mode. Accordingly, the computation unit 43 calculates the necessary charging amount using Equation (1) based on the energy saving time calculated in step S107 and the power consumption amount during the energy saving mode.

Necessary charging amount [WH]=energy saving time [H]×power consumption amount during energy saving mode [W] (1)

Moreover, when the secondary battery 20 is 100 percent charged, the computation unit 43 calculates the necessary charging amount as shown in Equation (2). In other words, the computation unit 43 calculates the necessary charging amount using a full power amount at the time fully charged.

Necessary charging rate [%]=(necessary charging amount [WH])/(fully charged amount [WH])×100 [%] (2)

Subsequently, the computation unit 43 multiplies the necessary charging rate by the offset value updated in step S106 (step S110). The computation unit 43 then writes the updated offset value in the second storage unit 52 (step S111). The power control unit 45 starts allowing charging from the PSU 10 to the secondary battery 20 (step S112). Then, the process for calculating the necessary charging amount ends.

Accordingly, when a transition time to return to the normal mode is during the business hours, a next transition time to the energy saving mode is estimated to be during the business hours. Thus, when the time to return to the normal mode is during the business hours, the computation unit 43 calculates a necessary charging amount for the business hours, so that the power control unit 45 allows the secondary battery 20 to be charged only in the necessary charging amount for the business hours.

On the other hand, when the usage frequency has been stored in the second storage unit 52 in step S103, that is, the usage frequency has been set (Yes in step S103), the computation unit 43 calculates an expected energy saving time based on the usage frequency instead of the transition time stored in the first storage unit 51. In other words, the computation unit 43 reads the usage frequency from the second storage unit 52 (step S121).

Subsequently, the computation unit 43 calculates the expected energy saving time based on the usage frequency (step S122). For example, when a usage frequency of every three hours has been set, three-hour is calculated as an expected energy saving time since the energy saving mode continues for three hours. Next, the computation unit 43 calculates a necessary charging amount based on the expected energy saving time (step S123). The process for calculating the necessary charging amount based on the expected energy saving time is similar to that based on the energy saving time in step S109. Upon completion of the necessary charging amount calculation by the computation unit 43, the flow proceeds to step S112 in which the power control unit 45 starts allowing charging of the secondary battery 20 from the PSU 10.

Therefore, when a usage frequency has been set, the computation unit 43 calculates an expected energy saving time based on the usage frequency instead of calculation of an energy saving time based on the transition time stored in the first storage unit 51, so that a processing load of the computation unit 43 can be reduced.

In another example case, even when the usage frequency has been set, an offset value may be processed in steps S104 through S106, S110, and S111 and added to a necessary charging amount.

In step S102, when the time at which the operating mode is set to the normal mode is during non-business hours (No in step S102), the computation unit 43 reads a transition time of the non-business hours from the first storage unit 51 as illustrated in FIG. 4 (step S131). Then, the computation unit 43 determines a total energy saving time by adding all the energy saving times obtained based on the transition times at which transition is made to the normal mode for the first time each day read from the first storage unit 51. Herein, assume that an energy saving time is a time period from a time at which non-business hours begin to a first transition time at which transition is made to the normal mode for the first time of the following day. Subsequently, the computation unit 43 calculates an average value of the energy saving times by dividing the total energy saving time by the number of times of transition to the energy saving mode during the non-business hours, that is, the number of transition times for the respective energy saving times used as addition targets. Accordingly, the computation unit 43 provides this average value as the energy saving time (step S132).

The computation unit 43 calculates a necessary charging amount for non-business hours based on the energy saving time calculated in step S132 (step S133). The process for calculating the necessary charging amount from the energy saving time is similar to that by the computation unit 43 in step S109. Upon completion of the necessary charging amount calculation by the computation unit 43, the flow proceeds to step S134 in which the power control unit 45 starts allowing charging of the secondary battery 20 from the PSU 10. Accordingly, when the power state is transitioned to St2, the computation unit 43 calculates the necessary charging amount for non-business hours, and the power control unit 45 allows the secondary battery 20 to be charged only in the necessary charging amount for the non-business hours.

A duration of an energy saving time is expected to vary depending on business hours or non-business hours. Thus, when the business hours has been set, the charge and discharge controller 40 according to the present embodiment calculates a necessary charging amount for the business hours based on the energy saving time during the business hours, and then calculates the necessary charging amount for non-business hours based on the energy saving time during the non-business hours. Therefore, the secondary battery 20 can be charged only in a necessary charging amount that is appropriate according to each time period.

Moreover, in step S101, when the business hours has not been set (No in step S101), the necessary charging amount is calculated based on all the transition times as illustrated in FIG. 5 instead of separation of business hours and non-business hours and calculation of each of the necessary charging amounts as described above. Particularly, the computation unit 43 first reads the offset value from the second storage unit 52 (step S141), obtains a charging rate of the secondary battery 20 (step S142), and then updates the offset value (step S143).

Subsequently, the computation unit 43 reads all the transition times stored in the first storage unit 51 (step S144), and then calculates an energy saving time based on the read transition times (step S145). Next, the computation unit 43 calculates a necessary charging amount based on the energy saving time calculated in step S145 (step S146). The power control unit 45 starts allowing charging to the secondary battery 20 (step S147). The processes of steps S141 through S147 are similar to those of steps S104 through S112 except for the transition time which is a target to be processed, that is, except for an energy saving time.

Therefore, even when the business hours is not set, a necessary charging amount can be calculated based on a daily average energy saving time, so that the secondary battery 20 can be charged only in the necessary charging amount.

FIG. 6 is a graph schematically illustrating a change in an amount of electric power of the secondary battery 20 during a single day. The graph of FIG. 6 illustrates an example case where business hours is set and each of the necessary charging amounts for business hours and non-business hours is calculated. Since the graph illustrated in FIG. 6 is a schematic graph, a charging time, a power consumption amount in energy saving, and an inclination of a charging amount at the time of charging are examples. Although the necessary charging amount for the business hours is constant, an actual necessary charging amount varies as it is calculated whenever transition is made to the normal mode.

At a time $t_1$ in FIG. 6, an operating mode is shifted to the normal mode, whereas the power state is transitioned from St3 to St0. Herein, the computation unit 43 calculates a necessary charging amount for business hours, and the secondary battery 20 is charged from a time after the time $t_1$. At a time $t_2$, a charging amount of the secondary battery 20 reaches the necessary charging amount, and the power state is transitioned from St0 to St1. At a time $t_3$, the operating mode is shifted from the normal mode to the energy saving mode, and the power sate is transitioned from St1 to St3. In a time after the time $t_3$, the secondary battery 20 is discharged, that is, electric power is supplied from the secondary battery 20 to the MFP 1. At a time $t_4$, it becomes non-business hours, and the power state is transitioned from St3 to St2.

In the MFP 1 according to the present invention, transition times are accumulated in the first storage unit 51, and whenever transition is made to the normal mode, a necessary charging amount is calculated and the offset value is updated, thereby converging into an appropriate necessary charging amount. This can reduce occurrences of supplying the power from the PSU 10 to the MFP 1 due to empties of power in the secondary battery 20 in the energy saving mode. Therefore, a state in which the PSU 10 is not used in the energy saving mode (St3 state in FIG. 2) can continue for a longer time. Moreover, a charging amount can be suppressed to a minimum necessary amount, thereby reducing deterioration of the secondary battery 20 while increasing longevity of the secondary battery 20.

Moreover, since the first storage unit 51 according to the present embodiment does not store more than the prescribed number of transition times, an appropriate energy saving time can be calculated based on only relatively new transition times. Also, a user can input a deletion instruction and allow any portions or all of the transition times stored in the first storage unit 51 to be deleted by the deletion unit 46. Therefore, for example, when a usage state of the MFP 1 is changed, a transition time prior to the change can be deleted, so that an appropriate necessary charging amount can be calculated based on the transition time subsequent to the change of the usage state.

Moreover, when business days has been stored in the second storage unit 52, that is, when business days has been set, the computation unit 43 may calculate a necessary charging amount based on an energy saving time of the business days. This allows exclusion of an energy saving time of non-business days that differ from the business days in usage state of the MFP 1, so that an appropriate necessary charging amount can be calculated.

The computation unit 43 according to the present embodiment uses an average value of all the energy saving times obtained from all the transition times stored in the first storage unit 51 as the energy saving time. However, the energy saving time calculation method is not limited thereto. For example, the computation unit 43 may use a standard deviation of all the energy saving times obtained from the all the transition times stored in the first storage unit 51 as the energy saving time. Alternatively, the computation unit 43 may use an average value of energy saving times obtained from one portion of the transition times stored in the first storage unit 51 as an energy saving time. Accordingly, the energy saving time can be a value that reflects energy saving time defined by past transition times stored in the first storage unit 51.

The computation unit 43 according to the present embodiment calculates a necessary charging amount for business hours when the power state is set to St0, whereas the computation unit 43 calculates a necessary charging amount for non-business hours when the power state is transitioned to St2. Alternatively, the computation unit 43 may calculate a necessary charging amount for business hours and a necessary charging amount for non-business hours when a power state is set to St0. In such a case, when the power state is transitioned to St2, the power control unit 45 refers to the non-business hour necessary charging amount calculated in the state St0, and allows charging of the secondary battery 20 up to this necessary charging amount.

According to the embodiments, power is supplied from the secondary battery to the image forming apparatus, the energy saving time during which the image forming apparatus is set to the energy saving mode and consumes less power than that in the normal mode is measured, and then the second battery is charged only in a charging amount calculated based on the energy saving time, so that an excess amount of power is not charged to the secondary battery, thereby increasing longevity of the secondary battery.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a power supply unit configured to supply power;
   a secondary battery configured to be charged with the power from the power supply unit and to supply the charged power;
   a receiving unit configured to receive an input regarding a print process from a user;
   a mode setting unit configured to set the image forming apparatus to be in a normal mode or an energy saving mode based on the input from the user, the normal mode causing the image forming apparatus to be operated by the power supplied from the power supply unit, the energy saving mode causing the image forming apparatus to be operated by the power supplied from the power supply unit or the secondary battery so that power consumption of the image forming apparatus is less than that in the normal mode;
   a charging amount calculation unit configured to calculate a charging amount of the secondary battery based on an energy saving time that is a time for which the image forming apparatus has been in the energy saving mode;
   a charging unit configured to charge the secondary battery by the charging amount calculated by the charging amount calculation unit; and
   a transition time storage unit configured to store therein a transition time at which the mode setting unit shifts the image forming apparatus from the normal mode to the energy saving mode, or vice versa, the transition time being stored in a deletable manner, wherein
   the charging amount calculation unit determines the energy saving time based on the transition time stored in the transition time storage unit and calculates the charging amount based on the energy saving time,
   the receiving unit further receives an instruction to delete the transition time stored in the transition time storage unit from the user, and
   the image forming apparatus further comprises a deletion unit configured to delete at least one transition time stored in the transition time storage unit when the receiving unit receives the instruction.

2. The image forming apparatus according to claim 1, wherein
   the receiving unit further receives an input of business hours for business work using the image forming apparatus in a day from the user,
   the image forming apparatus further comprises a business hour storage unit configured to store therein the business hours received by the receiving unit,
   when the image forming apparatus is set to be in the normal mode by the mode setting unit, the charging amount calculation unit determines whether the time at which the normal mode is set is in the business hours stored in the business hour storage unit, and calculates the charging amount based on the energy saving time in the business hours if the time is in the business hours, and
   the charging unit starts charging the secondary battery by the charging amount in the normal mode.

3. The image forming apparatus according to claim 2, wherein
   when the image forming apparatus is set to be in the normal mode by the mode setting unit, the charging amount calculation unit determines whether the time at which the normal mode is set is in the business hours stored in the business hour storage unit, and calculates the charging amount based on the energy saving time in non-business hours if the time is not in the business hours, and the charging unit starts charging the secondary battery by the charging amount in the normal mode.

4. The image forming apparatus according to claim 1, wherein the receiving unit further receives an input of a business days for business work using the image forming apparatus in a day from the user, the image forming apparatus further comprises a business day storage unit configured to store therein the business days received by the receiving unit, and the charging amount calculation unit calculates the charging amount based on the energy saving time for the business days stored in the business day storage unit.

5. The image forming apparatus according to claim 1, wherein the receiving unit further receives an input of a business hours for business work using the image forming apparatus in a day and an input of a usage frequency of the image forming apparatus in the business hours, from the user, the image forming apparatus further comprises:
  a business hours storage unit configured to store therein the business hours received by the receiving unit;
  a usage frequency storage unit configured to store therein the usage frequency received by the receiving unit; and
  an expected energy saving time calculation unit configured to calculate an expected energy saving time based on the usage frequency stored in the usage frequency storage unit, wherein, when the image forming apparatus is set to be in the normal mode by the mode setting unit, the charging amount calculation unit determines whether the time at which the normal mode is set in the business hours stored in the business hour storage unit, and calculates the charging amount based on the expected energy saving time calculated by the expected energy saving time calculation unit, and the charging unit starts charging the secondary battery by the charging amount in the normal mode.

6. The image forming apparatus according to claim 1, wherein the charge calculation unit calculates the charging amount when the image forming apparatus is set to be in the normal mode by the mode setting unit, the charging unit starts charging the secondary battery by the charging amount in the normal mode, and the image forming apparatus further comprises a power control unit configured to cause the secondary battery to supply the power if charging of the secondary battery by the charging amount is completed at the time when the mode setting unit shifts the image forming apparatus from the normal mode to the energy saving mode, and to cause the power supply unit to supply the power if charging of the secondary battery by the charging amount is not completed at the time when the mode setting unit shifts the image forming apparatus from the normal mode to the energy saving mode.

7. The image forming apparatus according to claim 6, wherein the power control unit causes the power supply unit to supply the power to the secondary battery until completion of the charging of the charging amount if charging of the secondary battery by the charging amount is not completed at the time when the image forming apparatus is shifted from the normal mode to the energy saving mode, and allows the charging of the secondary battery from the power supply unit to continue until completion of the charging of the charging amount.

8. An image forming method performed by an image forming apparatus, the method comprising:

receiving, an input regarding a print process from a user;

setting, the image forming apparatus to be in a normal mode or an energy saving mode based on the input from the user, the normal mode causing the image forming apparatus to be operated by the power supplied from a power supply unit of the image forming apparatus, the energy saving mode causing the image forming apparatus to be operated by the power supplied from the power supply unit or a secondary battery of the image forming apparatus so that power consumption of the image forming apparatus is less than that in the normal mode, the secondary battery being configured to be charged with the power from the power supply unit;

calculating, a charging amount of the secondary battery based on an energy saving time that is a time for which the image forming apparatus has been in the energy saving mode;

charging, the secondary battery by the calculated charging amount; and storing a transition time at which the setting shifts the image forming apparatus from the normal mode to the energy saving mode, or vice versa, the transition time being stored in a deletable manner, wherein the calculating includes determining the energy saving time based on the stored transition time and calculating the charging amount based on the energy saving time, the receiving including receiving an instruction to delete the stored transition time from the user, and the method further comprises deleting at least one stored transition time when the the instruction is received.

* * * * *